United States Patent Office 3,333,942
Patented Aug. 1, 1967

3,333,942
AGRICULTURAL CHEMICAL COMPOSITIONS
Gilbert Spencer Hartley, Fulbourn, and Roynon Howes, Saffron Walden, England, assignors to Fisons Pest Control Limited, Harston, England
No Drawing. Filed Dec. 5, 1963, Ser. No. 328,182
Claims priority, application Great Britain, Dec. 13, 1962, 47,057/62
17 Claims. (Cl. 71—93)

The present invention concerns improvements in agricultural chemical and other compositions.

When biologically active compounds are intended to be sprayed onto plants, particularly in the case of compounds which are insoluble or only slightly soluble in water, it is usual to add to the compositions a certain amount of surface active agents in order to promote the formation of a fine and stable aqueous suspension and to secure that the sprayed suspension wets the leaf and spreads on it. Wetting and suspending agents as used for this purpose include for example alkali soaps, sulphuric esters and sulphonic acid derivatives of hydrocarbons, fatty quaternary nitrogen compounds, fatty polyethylenoxy compounds and cellulose sulphite waste liquors. Such agents applied singly or several together, serve the purpose of stabilising a sprayable dispersion and of securing a good coverage of the leaves quite satisfactorily, but their continued presence in the composition after spraying has the rather unwanted effect of causing the active compound to be easily washed off the leaves by rain. To counteract this a sticking agent is required, starch or glue in various stages of degradation being most commonly used.

A serious problem which exists regarding the storage and transport of aqueous concentrates is that the concentrate deteriorates on storage and is non-homogeneous due to classification and separation of components, and is difficult to resuspend and even more difficult to disperse satisfactorily in water.

It has now been found that by preparing a formulation of a solid agricultural chemical, a sodium salt of a long chain fatty acid and water as hereinafter defined, a solid gel is formed on standing, so that in storage and transport the homogeneity of the mixture is maintained, but this solid gel is readily fluidised by stirring and can be sprayed with or without dilution with water.

Accordingly the present invention is for an agricultural chemical composition which forms a solid gel on standing which comprises a solid agricultural chemical which is insoluble or slightly soluble in water, the sodium salt of a long chain saturated aliphatic carboxylic acid of 12–24 carbon atoms, and water in amount comprising 50–200 times the weight of the sodium salt. Preferably the water is present in amount comprising 70–150 times the weight of the sodium salt.

Particularly troublesome problems in the spraying of agricultural chemicals under modern conditions, for example from aircraft, arise fom the evaporation of the spray during passage from the spraying equipment to the target, and from the inadequate adhesion of the product on the target. It has now been found that in the compositions according to the invention a greatly reduced tendency to evaporation and greater adhesion is obtained if the composition also contains a long chain saturated aliphatic carboxylic acid of 12–24 carbon atoms and a volatile base.

Accordingly a preferred embodiment of the invention is for an agricultural chemical composition which forms a solid gel on standing which comprises a solid agricultural chemical which is insoluble or slightly soluble in water, long chain saturated aliphatic carboxylic acid of 12–24 carbon atoms of which from 5–30 mol percent is present as the sodium salt, volatile base in amount comprising 100–200 mol percent of the long chain saturated aliphatic carboxylic acid not present as the sodium salt, and water in amount comprising 50–200 times, and preferably 70–150 times, the weight of the sodium salt.

The present invention is also for a process for treating plants or the soil with agricultural chemical compositions as defined above, brought into a fluid condition by stirring, with or without further dilution in water.

The agricultural chemical is preferably insoluble or substantially insoluble in water and may comprise a fungicide, insecticide, pesticide, herbicide, plant growth regulant or other chemical used to ensure plant health. Examples of agricultural chemicals which may be mentioned include fungicides such as fungicidal copper compounds, for example cuprous oxide, cupric hydroxide and copper oxychloride, nickel fungicides, for examle nickel hydroxide, the organo sulphur fungicides, for example tetramethylthiuram disulphide and 4,5,6,7-tetrachloroquinoxaline; or insecticides such for example as a culture of B. thuringiensis or related strains or species, DDT, aldrin, dieldrin and BHC; or other pesticides such as molluscicides, vermicides, nematocides and the like; or herbicides, such as N-parachlorophenyl-N'N'-dimethylurea, simazine (chlorobismonoethylamino-s-triazine) and atrazine (chloromono-propylamino-monoethylamino-s-triazine); or mixtures of any of the above together or with other materials.

The solid agricultural chemical is obviously finely ground before incorporation in the compositions according to the invention. Desirably the particles are less than 50 microns in the longest dimensions and preferably the particles are of a size in the range 5–15 microns.

The amount of the agricultural chemical included in the compositions according to the present invention is related to the activity of the chemical and the purpose for which it is to be used. In general the amount of the agricultural chemical lies between about one-tenth and fifty times the weight of the sodium salt of the long chain saturated aliphatic carboxylic acid. The agricultural chemical composition may also contain a solid inert diluent, used for example in grinding the agricultural chemical or incorporated for other reasons. The presence of such inert diluents may increase the solids content of the gel up to one hundred and fifty times the weight of the sodium salt.

The long chain saturated aliphatic carboxylic acid suitably contains 12–24 carbon atoms and desirably comprises for example an acid which is solid at normal temperatures preferably containing at least 15 carbon atoms in the chain and for example 15–24 carbon atoms. Acids which may be mentioned include palmitic acid, stearic acid, arachidic acid and mixtures containing the same. The long chain saturated aliphatic carboxylic acid is preferably stearic acid and this will normally be used in the form of a commercial grade of stearic acid which may contain considerable proportions of palmitic and arachidic acids; thus commercial stearic acid usually contains about 40% by weight of palmitic acid and 2% by weight of unsaturated acids, calculated as oleic acid. The commercial acids employed should contain not more than 20% by weight of unsaturated acids, and preferably should contain less than 5% by weight of unsaturated acids.

The sodium salt of the long chain saturated aliphatic carboxylic acid may be added to the composition as such or may be formed in situ by the addition of the appropriate amount of a suitable sodium compound such as sodium hydroxide, sodium carbonate, and the like.

The volatile base may comprise ammonia or an amine with a high volatility from aqueous solution. The amine may comprise a primary, secondary or tertiary amine including for example lower amines such as mono-, di- and tri-methyl and ethyl amines. However the use of lower amines has the undesirable feature in practice that the product can build up a stable foam when agitated in such a way as to incorporate air. Moreover compositions containing them have low flash points. It is therefore a preferred feature of the invention to use an amine of higher molecular weight, suitably containing more than 6 carbon atoms since these have a much reduced tendency to build up a stable froth. Preferably the amine does not contain more than 16 carbon atoms since amines of higher molecular weight than this tend to form two-phase mixtures with fatty acids and water. Examples of the higher molecular weight amines which may be used include tertiary amines such as tri-n-propyl, tri-iso-propyl, methyldipropyl, methyldiallyl, methyldibutyl, methyldiamyl, dimethyloctyl, dimethylcyclohexyl, dimethyldecyl, tri-n-butyl, tri-amyl, benzyldimethyl, benzyldiethyl and (m-methylbenzyl) diethylamines, or secondary amines such as methyloctyl, ethylamyl, methylcyclohexyl, methylbenzyl and methyldecyl amines, or primary amines such as octyl and decyl amines. If desired mixtures of any of these amines together or with other amines may be used.

It has been found particularly advantageous to use amines of 6–10 carbon atoms. According to a further preferred embodiment of the invention the amine is methyldibutylamine or tripropylamine.

The thixotropic gel composition according to the present invention may be made by mixing the components of the mixture together. Suitably for example the fatty acid, the sodium salt of the fatty acid or a sodium compound where the sodium salt is to be formed in situ, and water are heated together with stirring to above 60° C. The resulting solution is allowed to cool and the finely divided agricultural chemical is added at a temperature below its melting point, and the volatile base added after cooling. The mixture is finally diluted further with water, if necessary.

On standing this mixture forms a gel, which can be fluidised by stirring. In use the compositions may be sprayed as such, or preferably sprayed after dilution with water, suitably in the ratio of 1:1 to 5:1.

The following examples are given to illustrate the present invention. The parts and percentages are by weight.

*Example 1*

60 parts of stearic acid, 1.4 parts of sodium hydroxide and 800 parts of water were heated together in a vessel under stirring until the temperature reached 65–70° C. Then 350 parts of finely divided copper oxychloride were added and the mixture allowed to cool to 30° C. with stirring. 10 parts of trimethylamine were then added together with a further 100 parts of water. The mixture was allowed to stand, forming a thin gel. The gel was sufficiently stable to resist normal transport handling, but could be readily fluidised on stirring.

The gel was fluidised by stirring and was diluted with water in a proportion of 2:1 and sprayed using a low volume sprayer from a height of 7 metres on to banana leaves under atmospheric conditions of 45% relative humidity and 36° C. The droplets of spray arrived on the leaves in a moist condition and the chemical was not removed from the leaves by the application of 10 centimetres of artificial rain.

*Example 2*

60 parts of stearic acid, 0.7 part of sodium hydroxide and 800 parts of water were heated together in a vessel under stirring until the temperature reached 65–70° C. The mixture was allowed to cool to 30° C. with stirring. Then 150 parts of dieldrin (micronized after mixing with 15 parts of sepiolite) were added. 24 parts of methyldibutylamine were then added together with a further 100 parts of water. The mixture was allowed to stand, forming a thin gel. The gel was sufficiently stable to resist breaking on normal transport handling, but could be readily fluidised by stirring.

The gel was fluidised by stirring and was diluted with water in a proportion of 3:1 and sprayed using a low volume sprayer from a height of 7 metres on to banana leaves under atmospheric conditions of 45% relative humidity and 36° C. The droplets of spray arrived on the leaves in a moist condition and the chemical was not removed from the leaves by the application of 10 centimetres of artificial rain.

*Example 3*

100 parts of palmitic acid, 1.3 parts of sodium hydroxide and 800 parts of water were heated together in a vessel under stirring until the temperature reached 65–70° C. Then 100 parts of finely divided atrazine were added and the mixture allowed to cool to 30° C. with stirring. 45 parts of methyldibutylamine were then added together with a further 100 parts of water. The mixture was allowed to stand, forming a thin gel. The gel was sufficiently stable to resist normal transport handling, but could be readily fluidised on stirring.

The gel was fluidised by stirring and was diluted with water in a proportion of 5:1 and sprayed using a low volume sprayer from a height of 7 metres on to banana leaves under atmospheric conditions of 45% relative humidity and 36° C. The droplets of spray arrived on the leaves in a moist condition and the chemical was not removed from the leaves by the application of 10 centimetres of artificial rain.

*Example 4*

70 parts of arachidic acid, 0.8 part of sodium hydroxide and 800 parts of water were heated together in a vessel under stirring until the temperature reached 65–70° C. The mixture was allowed to cool with gentle stirring until it had cooled to 30° C. when 37 parts of tripropylamine were added.

200 parts of technical DDT were mixed with 50 parts of calcium silicate commercially available as Calflo E and ground in a micronizer mill. This finely divided mixture was then added to the mixture produced above. On cooling this formed a thin gel which was sufficiently stable to resist normal transport handling, but could be readily fluidised on stirring.

The gel was fluidised by stirring and was diluted with water in a proportion of 5:1 and sprayed using a low volume sprayer from a height of 7 metres on to banana leaves under atmospheric conditions of 45% relative humidity and 36° C. The droplets of spray arrived on the leaves in a moist condition and the chemical was not removed from the leaves by the application of 10 centimetres of artificial rain.

*Example 5*

60 parts stearic acid, 1.2 parts of sodium hydroxide and 920 parts of water were heated with stirring to 65–70° C. 250 parts of 4,5,6,7-tetrachloroquinoxaline were mixed with 50 parts dried sodium salt of lignum sulphonic acid and the mixture micronized. The resultant powder was stirred into the above mixture. The mixture was then cooled to 30° C. and 28 parts of dibutylamine were added. On standing a thin gel formed which was sufficiently stable to resist normal transport handling, but could be readily fluidised on stirring.

*Example 6*

80 parts of stearic acid, 0.8 part of sodium hydroxide and 920 parts of water were heated with stirring to 65–70° C. 50 parts of N-p-chlorophenyl-N'N'-dimethylurea were micronised and stirred into this mixture, which was then cooled to 30° C. and 40 parts of dibutylamine were added. On standing a thin gel formed which was sufficiently stable to resist normal transport handling, but which could be readily fluidised on stirring.

Example 7

10 parts of stearic acid, 1.4 parts of sodium hydroxide and 900 parts of water were heated together in a vessel under stirring until the temperature reached 70° C. Then 100 parts of finely divided atrazine were added and the mixture allowed to cool and on being allowed to stand a thin gel was formed. This gel was sufficiently stable to resist normal transport handling, but could be readily fluidised on stirring.

We claim:

1. Composition of matter useful in treating plants and the soil comprising:
   (1) an effective amount of a solid agricultural pesticidal chemical;
   (2) long chain saturated aliphatic carboxylic acid of 12–24 carbon atoms of which 5–30 mol percent is present as the sodium salt;
   (3) volatile base in amount comprising 100–200 mol percent of the sodium salt of the long chain saturated aliphatic carboxylic acid, said volatile base being selected from the group consisting of ammonia and (a) aliphatic amine of from 1 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms;
   (4) water in amount comprising 50–200 times the weight of the sodium salt of the long chain saturated aliphatic carboxylic acid.

2. Composition of matter useful in treating plants and the soil comprising:
   (1) an effective amount of a solid agricultural pesticidal chemical;
   (2) long chain saturated aliphatic carboxylic acid of 12–24 carbon atoms of which 5–30 mol percent is present as the sodium salt;
   (3) amine of 7–16 carbon atoms in amount comprising 100–200 mol percent of the long chain saturated aliphatic carboxylic acid, said amine being selected from the group consisting of (a) aliphatic amine of from 7 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms;
   (4) water in amount comprising 50–200 times the weight of the sodium salt of the long chain saturated aliphatic carboxylic acid.

3. Composition of matter useful in treating plants and the soil comprising:
   (1) an effective amount of a solid agricultural pesticidal chemical;
   (2) stearic acid of which 5–30 percent is present as the sodium salt;
   (3) volatile base in amount comprising 100–200 mol percent of the sodium stearate, said volatile base being selected from the group consisting of ammonia and (a) aliphatic amine of from 1 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms;
   (4) water in amount comprising 50–200 times the weight of the sodium stearate.

4. Composition of matter useful in treating plants and the soil comprising:
   (1) solid agricultural herbicidal chemical;
   (2) stearic acid of which 5–30 mol percent is present as the sodium salt;
   (3) amine of 7–16 carbon atoms in amount comprising 100–200 mol percent of the sodium stearate, said amine being selected from the group consisting of (a) aliphatic amine of from 7 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms;
   (4) water in amount comprising 50–200 times the weight of the sodium stearate.

5. Composition of matter useful in treating plants and the soil comprising:
   (1) solid agricultural pesticidal chemical;
   (2) stearic acid of which 5–30 mol percent is present as the sodium salt;
   (3) amine of 7–16 carbon atoms in amount comprising 100–200 mol percent of the sodium stearate, said amine being selected from the group consisting of (a) aliphatic amine of from 7 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms;
   (4) water in amount comprising 50–200 times the weight of the sodium stearate.

6. Composition of matter useful in treating plants and the soil comprising:
   (1) solid agricultural fungicidal chemical;
   (2) stearic acid of which 5–30 mol percent is present as the sodium salt;
   (3) amine of 7–16 carbon atoms in amount comprising 100–200 mol percent of the sodium stearate, said amine being selected from the group consisting of (a) aliphatic amine of from 7 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms;
   (4) water in amount comprising 50–200 times the weight of the sodium stearate.

7. Composition of matter useful in treating plants and the soil comprising:
   (1) an effective amount of a solid agricultural pesticidal chemical;
   (2) long chain saturated aliphatic carboxylic acid of 12–24 carbon atoms;
   (3) sodium compound equivalent to 5–30 mol percent of the long chain saturated aliphatic carboxylic acid;
   (4) volatile base in amount comprising 100–200 mol percent of the sodium salt of the long chain saturated aliphatic carboxylic acid, said volatile base being selected from the group consisting of ammonia and (a) aliphatic amine of from 1 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 atoms;

(5) water in amount comprising 50–200 times the weight of the sodium salt of the long chain saturated aliphatic carboxylic acid.

8. Composition of matter as claimed in claim 6 wherein the sodium compound is selected from the group consisting of sodium hydroxide and sodium carbonate.

9. Composition of matter useful in treating plants and the soil comprising:
 (1) an effective amount of a solid agricultural pesticidal chemical;
 (2) long chain saturated aliphatic carboxylic acid of 12–24 carbon atoms of which 5–30 mol percent is present as the sodium salt;
 (3) methyldibutyl amine in amount comprising 100–200 mol percent of the sodium salt of the long chain saturated aliphatic carboxylic acid;
 (4) water in amount comprising 50–200 times the weight of the sodium salt of the long chain saturated aliphatic carboxylic acid.

10. Composition of matter useful in treating plants and the soil comprising:
 (1) an effective amount of a solid agricultural pesticidal chemical;
 (2) long chain saturated aliphatic carboxylic acid of 12–24 carbon atoms of which 5–30 mol percent is present as the sodium salt;
 (3) tripropylamine in amount comprising 100–200 mol percent of the sodium salt of the long chain saturated aliphatic carboxylic acid;
 (4) water in amount comprising 50–200 times the weight of the sodium salt of the long chain saturated aliphatic carboxylic acid.

11. A method of applying to plants and the soil a gel-form agricultural chemical composition comprising, as components thereof:
 (1) a solid agricultural pesticidal chemical;
 (2) long chain saturated aliphatic carboxylic acid of 12–24 carbon atoms of which 5–30 mol percent is present as the sodium salt;
 (3) volatile base in amount comprising 100–200 mol percent of the sodium salt of the long chain saturated aliphatic carboxylic acid, said volatile base being selected from the group consisting of ammonia and (a) aliphatic amine of from 1 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms;
 (4) water in amount comprising 50–200 times the weight of the sodium salt of the long chain saturated aliphatic carboxylic acid;
which comprises fluidising the gel by stirring, and applying a pesticidally effective amount of the resulting fluid to the plants and the soil.

12. A process as claimed in claim 11 wherein the gel after fluidising by stirring is diluted with water in a ratio of 1:1 to 1:5 before being applied to plants and the soil.

13. A process for the preparation of a thixotropic gel which comprises heating together:
 (1) long chain saturated aliphatic carboxylic acid of 12–24 carbon atoms of which 5–30 mol percent is present as the sodium salt; and
 (2) water in amount comprising 50–200 times the weight of the sodium salt of the long chain saturated aliphatic carboxylic acid;
to form a homogeneous mixture, adding thereto a solid agricultural pesticidal chemical in an effective amount at a temperature below its melting point, cooling, adding a volatile base in amount comprising 100–200 mol percent of the long chain saturated aliphatic carboxylic acid not present as the sodium salt, and allowing the mixture to stand to form a gel, said volatile base being selected from the group consisting of ammonia and (a) aliphatic amine of from 1 to 16 carbon atoms, (b) (di-lower alkyl) (cyclohexyl)amine of from 7 to 16 carbon atoms, (c) (phenyl-lower alkyl) (di-lower alkyl)amine of from 7 to 16 carbon atoms, (d) (di-lower alkyl) (lower alkylphenyl-lower alkyl)amine of from 7 to 16 carbon atoms, (e) (mono-lower alkyl) (cyclohexyl)amine of 7 to 16 carbon atoms, and (f) (mono-lower alkyl) (phenyl-lower alkyl)amine of 7 to 16 carbon atoms.

14. A composition as claimed in claim 1 wherein the solid agricultural pesticidal chemical is a fungicide.

15. A composition as claimed in claim 1 wherein the solid agricultural pesticidal chemical is a herbicide.

16. A composition as claimed in claim 1 wherein the solid agricultural pesticidal chemical is an insecticide.

17. A composition as claimed in claim 1 wherein the solid agricultural pesticidal chemical is a plant growth regulant.

References Cited
UNITED STATES PATENTS

| | | | |
|---|---|---|---|
| 2,907,691 | 10/1959 | Hartley et al. | 71—2.7 |
| 3,133,809 | 5/1964 | Hartley et al. | 71—2.7 |
| 3,220,823 | 11/1965 | Mihara | 71—2.7 |

LEWIS GOTTS, *Primary Examiner.*

E. L. ROBERTS, J. O. THOMAS, JR.,
*Assistant Examiners.*